United States Patent [19]

Truchet

[11] 4,311,328
[45] Jan. 19, 1982

[54] RAPID FITTING DEVICES FOR JOINING PIPES

[75] Inventor: Gaston Truchet, Faverges, France

[73] Assignee: S.A. des Etablissements STAUBLI (France), Faverges, France

[21] Appl. No.: 171,058

[22] Filed: Jul. 22, 1980

[30] Foreign Application Priority Data

Jul. 23, 1979 [FR] France ................ 79 19383

[51] Int. Cl.³ ............................ F16L 37/08
[52] U.S. Cl. .................... 285/308; 285/317
[58] Field of Search ............. 285/314, 315, 316, 317, 285/308, 277; 403/324, 325, 327, 328

[56] References Cited

U.S. PATENT DOCUMENTS

| | | | |
|---|---|---|---|
| 2,626,974 | 1/1953 | Howard et al. | 285/317 X |
| 2,913,263 | 11/1959 | Zajac | 285/317 X |
| 3,155,402 | 11/1964 | Cornelius | 285/277 X |
| 3,503,637 | 3/1970 | Maeshiba | 285/315 |

FOREIGN PATENT DOCUMENTS

| | | |
|---|---|---|
| 1403103 | 5/1965 | France . |
| 414280 | 12/1966 | France . |
| 1487323 | 7/1967 | France . |
| 473221 | 11/1937 | United Kingdom . |

Primary Examiner—David W. Arola
Attorney, Agent, or Firm—Dowell & Dowell

[57] ABSTRACT

The present invention relates to a rapid pipe coupling device of the type in which the male and female elements are locked by at least one bar housed in an oblique notch and urged forward locking by a spring. The locking member is formed by a push member movable in a transverse notch in the body; this push member has a wedge shaped slope oriented to displace the bar from locking position in response to manual pressure. The invention finds particular application in accessories for hydraulic or pneumatic installations.

1 Claim, 8 Drawing Figures

RAPID FITTING DEVICES FOR JOINING PIPES

The present invention relates to rapid coupling devices for joining pipes, constituted by a male element and a female element adapted to fit hermetically inside one another and to be immobilised axially by a locking mechanism, while causing the automatic opening of a loaded closure valve.

Devices of the above-mentioned type are known, in which the locking mechanism comprises at least one cylindrical bar oriented transversely with respect to the axis of the body of the female element and mounted to slide inside of oblique notches made in the said body, so as releasably to engage, under the effect of a suitably arranged return spring, in an annular depression provided on the fitting endpiece of the male element.

In the devices of this prior art type, unlocking with a view to separating the two elements of the fitting is effected by displacement an outer sleeve mounted for axial slide on the outer front wall of the body of the female element. This sleeve is arranged so that its axial displacement towards the rear releases the bar, consequently allowing the male element to be withdrawn under the effect of a simple axial traction exerted on said element.

Experience has shown that the unlocking sleeve with axial slide is particularly vulnerable on the periphery of the body of the female element. It is thus subjected to considerable deformations which cause more or less serious damage relatively frequently. In addition, its axial displacement risks causing its untimely release, particularly when said sleeve abuts against any fixed piece in the course of a longitudinal movement of the pipes on the ground.

It is an object of the improvements according to the present invention to remedy the above-mentioned drawbacks and to provide a rapid fitting device of the above-mentioned type which is capable of responding particularly well to the various desiderata of the art, particulary concerning the reliability of the unlocking system.

The device according to the invention is mainly noteworthy in that the unlocking member borne by the female element is constituted by a hollow push member through which the male element passes and which is provided with at least one sloping wedge shaped so as to act on the projecting ends of the locking bar, with a displacement oriented transversely with respect to the axis of the said element.

It will be understood that a push member of this type may be disposed within the contour of in the body of the female element, thus being protected from untimely deformations or stresses, whilst being adapted to be easily pressed by the operator with a view to separating the two elements of the device.

The invention will be more readily understood on reading the following description with reference to the accompanying drawings, in which.

Figure 1:
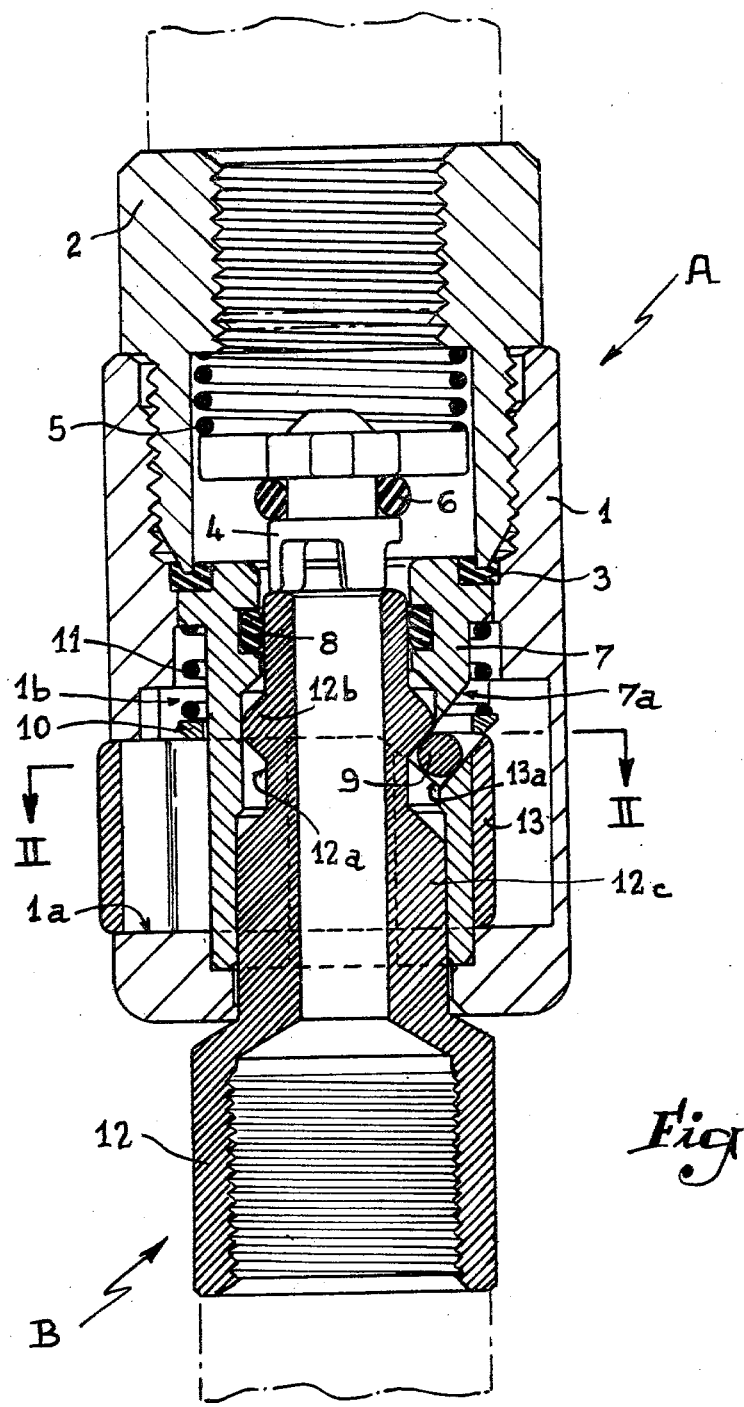
FIG. 1 is a schematic axial section through a rapid fitting device comprising the improvements according to the invention.

Referring now to the drawings, the body of the female element A of the device shown in FIG. 1 is constituted by the assembly of two tubular pieces 1 and 2, screwed with the interposition of an O-ring 3. The piece 2, adapted to be fixed to the end of one of the two pipes to be connected, contains a guided valve 4 which a spring 5 tends to maintain applied by its seal 6 against a corresponding annular seat. A bush 7 is fixed in the piece 1 whose opening is provided with an O-ring 8; this bush is provided with a notch 7a oriented obliquely from outside to inside from the rear part of the body 1-2, which notch 7a forms a housing for a cylindrical locking bar 9. A washer 10, urged by a spring 11, tends to push the bar 9 forwards.

This construction is conventional and does not need to be described in detail. As shown more particularly in FIG. 2, the bar 9, under the effect of the spring 11, may engage in a depression 12a provided to the rear of a flange 12b of bi-truncated section made on the end piece 12c of the body 12 of the male element B. This body 12 is arranged to be fixed to the end of the second pipe. Of course, the end piece 12c is dimensioned to fit in the bush 7 and push into open position the loaded valve 4, the O-ring 8 ensuring the seal of the fitting.

According to the present invention, the unlocking member is constituted by a push member 13 movable in a transverse notch 1a in the piece 1 of the body 1-2. This push member 13 has a closed section to overlap the bush 7 which cooperates in its guiding; in its inner part, its rearwardly turned edge is provided with a slope 13a (FIG. 3) of square section, which slope forms a stop for the bar 9 which, under the effect of its spring 11, tends to push said push member 13 towards the outside. In this rest position, and as shown in FIG. 2, the outer wall of the push member 13 is disposed virtually at the level of the outer wall of the piece 1.

Figure 3:
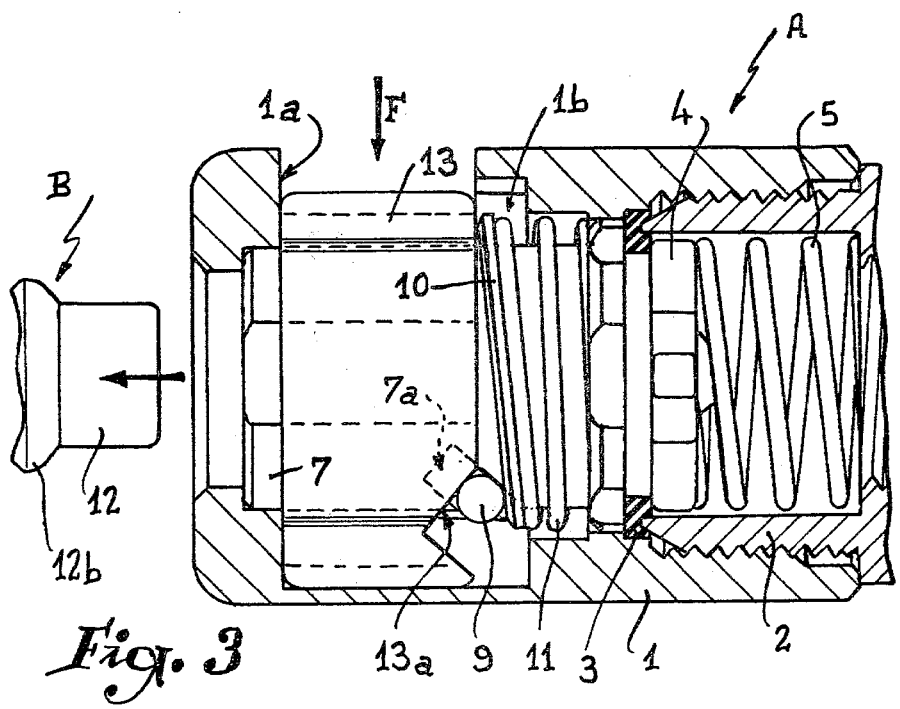
FIG. 3 illustrates the functioning of the unlocking push member.
Figure 4:
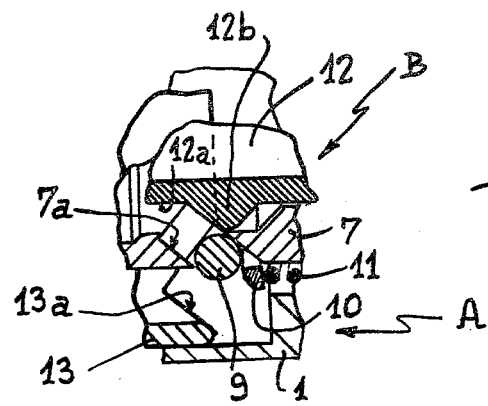
FIG. 4 is a detailed section showing the position of the bar when the push member is actuated.

Of course, this push member 13 does not interfere in any way with the functioning of the locking mechanism, the bar 9 engaging in the depression 12a in the body of the male element. On the contrary, it will be understood that a pressure exerted in the direction indicated by arrow F of FIG. 3 has for its effect to drive the push member toward the body of the female element. As shown in FIG. 4, the slope 13a abutting against the bar 9 then displaces the latter which moves radially outwardly such that it releases the flange 12b so that, the end piece 12c of the male element B may consequently be disengaged from the female element A.

Figure 2:
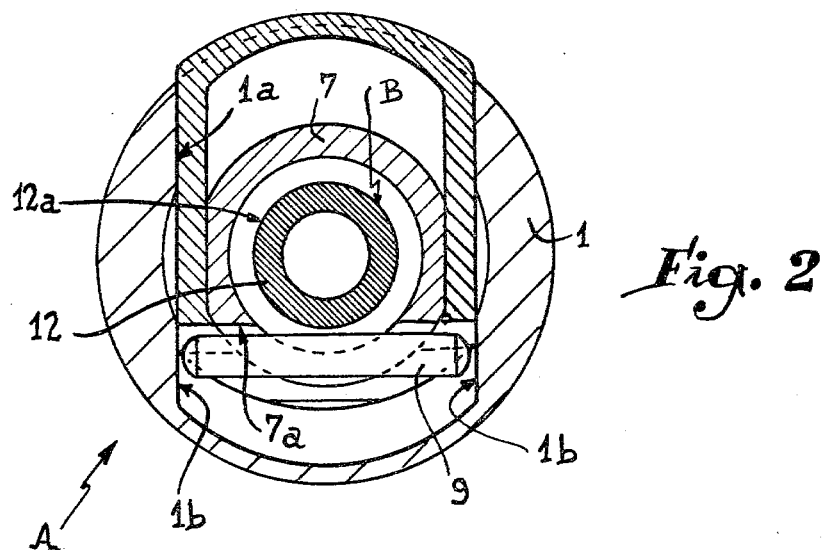
FIG. 2 is a transverse section along II—II (FIG. 1).

It is obvious that, as soon as the user stops pressing the push member 13, the latter returns to its initial position of FIGS. 1 and 2, so that the device is ready for a fresh fitting insertion. FIG. 1 clearly shows that this push member 13 is fitted in the body of the female element A, so that it is protected from any accidental stress or deformation.

Figure 5:
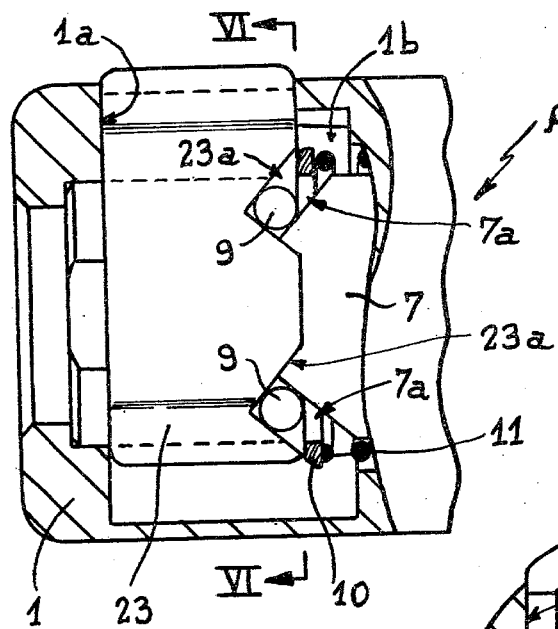
FIG. 5 shows a device according to the invention provided with two opposite locking bars.
Figure 6:
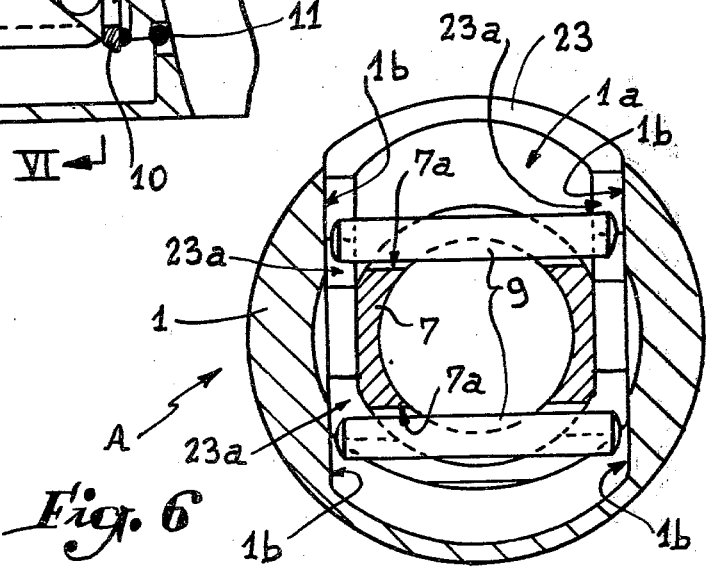
FIG. 6 is the transverse section along VI—VI (FIG. 5).

FIGS. 5 and 6 illustrate an embodiment of the invention in which the locking mechanism comprises two cylindrical bars 9 oriented parallel to each other. Obviously, the central bush 7 presents two oblique notches or housings 7a for receiving these two bars which are urged by the same spring 11 associated with the same washer 10, whilst the push member, here referenced 23, is provided with two slopes 23a. One of the slopes, namely the one located on the side opposite the surface for actuation of the push member, is identical to the slope 13a of FIGS. 1 to 4, whilst the other is formed (FIG. 6) by two opposite parts obtained by machining the rear edge of said push member. Locking and unlocking operations are similar to those described hereinabove.

Figure 7:
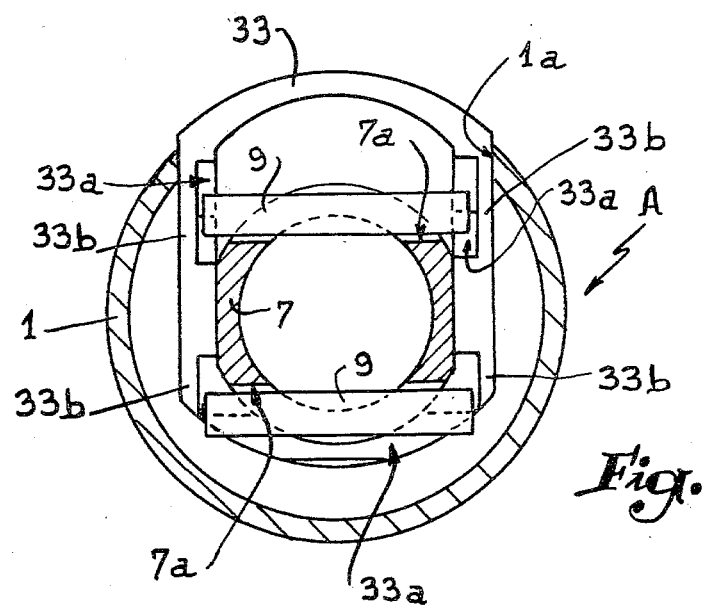
FIGS. 7 and 8 illustrate a variant embodiment of the embodiment of the invention according to FIGS. 5 and 6.
Figure 8:
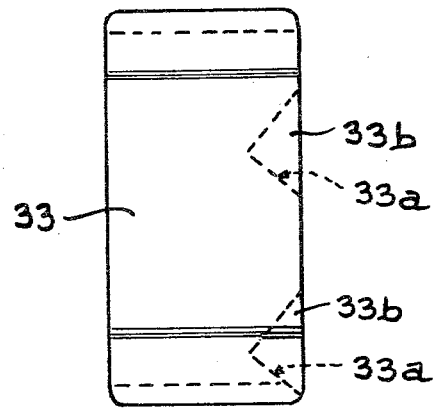

In the two embodiments which have just been described, the single bar or each of the two locking bars were held in the axial direction by abutment against flat faces 1b provided at the level of the inner wall of the piece 1 of the body 1-2. In the variant illustrated in FIGS. 7 and 8, corresponding to locking with the aid of two bars 9, the push member referenced 33 comprises, in addition to the actuation slops 33a, flat surfaces 33b which close said slopes laterally and which form stops limiting sideways displacement of the above-mentioned bars.

The preceding description has, of course, been given solely by way of example and in no way limits the domain of the invention, the replacement of the details of execution described by any other equivalents not departing from the scope thereof.

What is claimed is:

1. In a fitting for joining two pipes, the fitting having a female member attached to one pipe and a male member attached to the other pipe and axially fitting into the female member, the male member having an annular depression therearound and the female member having at least one slot therein opposite said depression and opening obliquely thereinto, and the female member having a cylindrical locking bar occupying each slot and having a central portion between its ends which can enter the depression of the male member and having axially acting spring means yieldably urging the locking bar to engage in the depression of the male member, improved means for displacing the bar from the depression comprising:

(a) in the female member a notch extending transversely thereinto adjacent to the oblique slot; and (b) an unlocking member supported in the female member in the notch and surrounding the male member, the unlocking member having inner edges including surfaces sloping at right angles to the oblique slot and abutting the ends of the locking bar, whereby when the unlocking member is displaced transversely inwardly of the female member the sloping surfaces will displace the locking bar into the slot away from the depression in the male member, and when the locking member is released the urging of the spring means will return the bar to the depression and move the unlocking means outwardly.

* * * * *